Patented June 27, 1933

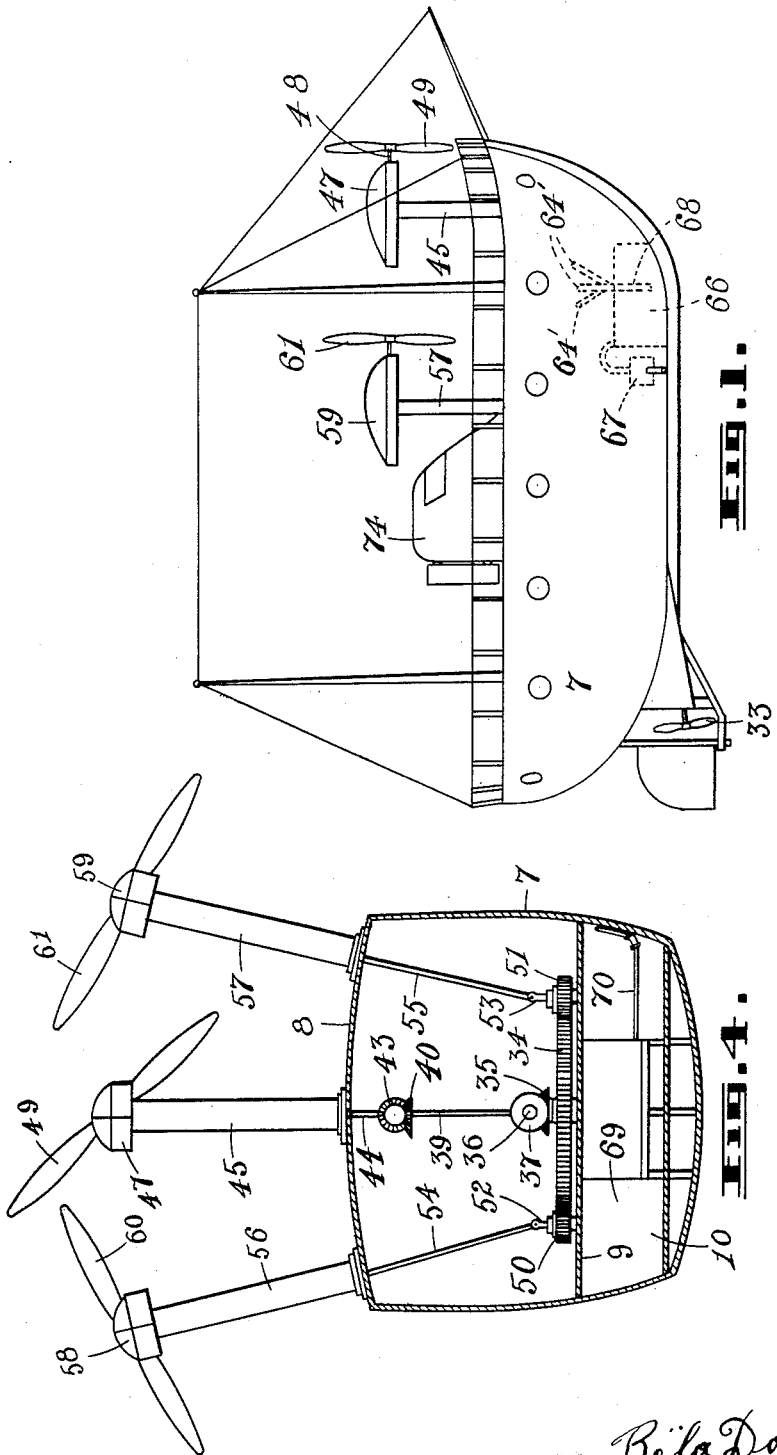

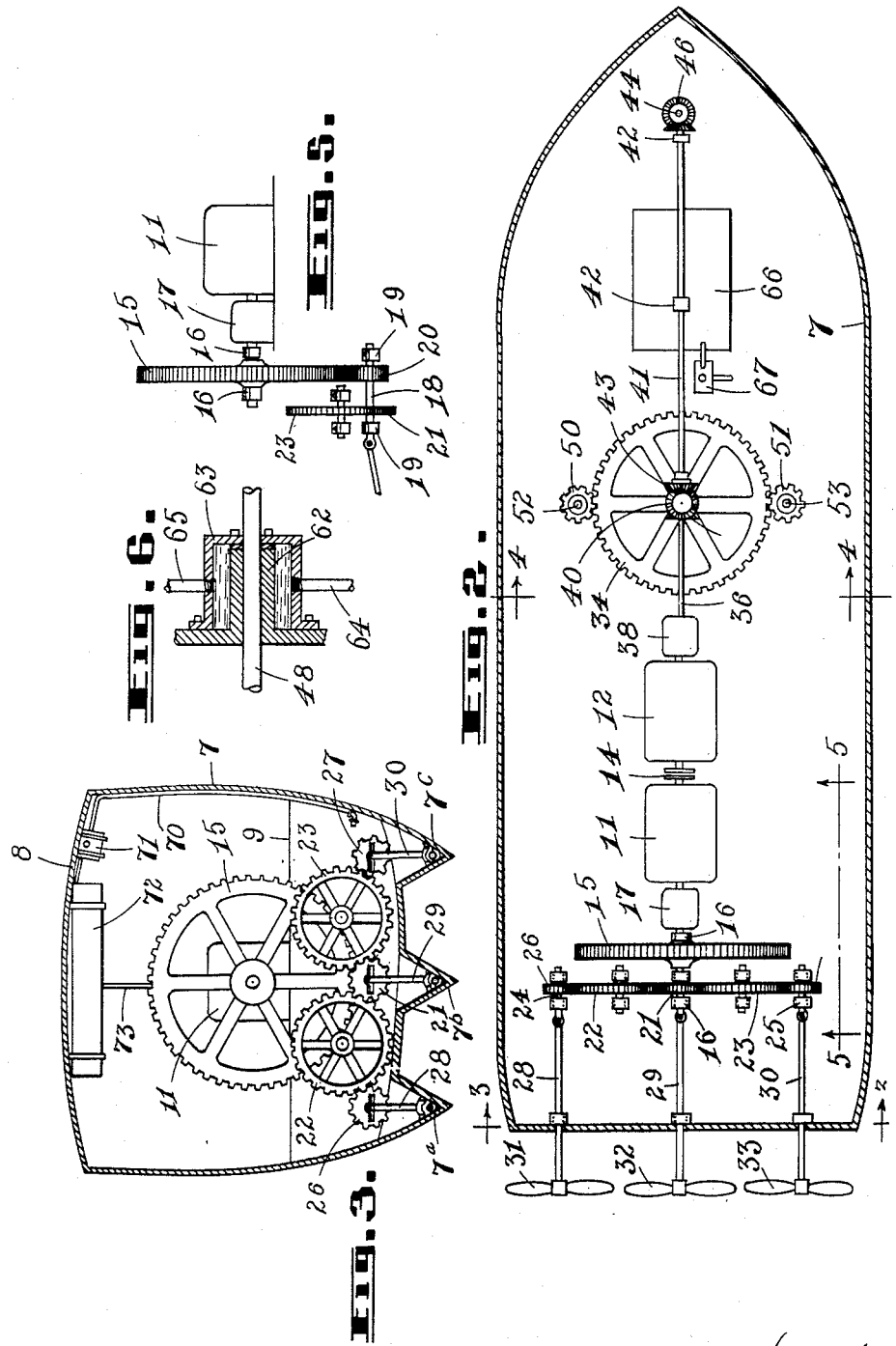

1,916,121

UNITED STATES PATENT OFFICE

BÉLA DOMBRÁDÝ, OF OTTAWA, ONTARIO, CANADA, ASSIGNOR OF ONE-SIXTH TO ALEX CHUCHRY, ONE-SIXTH TO JOHN SHYNGERA, AND ONE-SIXTH TO MIKE NARATKA, ALL OF OTTAWA, CANADA

BOAT

Application filed January 6, 1933, Serial No. 650,532, and in Canada September 9, 1932.

This invention relates to boats and the principal object of which is the provision of a motor driven boat so constructed that the same may be propelled at a high rate of speed.

A further object of my invention is the provision of a boat provided with water propellers and air propellers geared, through a series of reduction gears, to one or more power motors in such a manner that a high velocity of R. P. M. may be attained thereby.

With the foregoing and other objects in view, as will appear as the description proceeds, the invention consists of the novel construction, combination and arrangement of co-operating elements as hereinafter more specifically set forth, claimed and shown in the accompanying drawings forming a part of the present application, in which:

Fig. 1 is a side elevation of the preferred embodiment of my boat.

Fig. 2 is a sectional horizontal view of my boat, disclosing the motors and respective gears between the motors and the water and air propellers respectively.

Fig. 3 is a sectional view taken on the line 3—3 of Fig. 2.

Fig. 4 is a sectional view taken on the line 4—4 of Fig. 2.

Fig. 5 is a sectional view taken on the line 5—5 of Fig. 2.

Fig. 6 is a detail sectional view of one of the bearings on the propeller shafts.

Like numerals of reference designate corresponding parts throughout the different views.

My boat comprises a hull 7, the upper and lower decks 8 and 9 respectively and hold 10. Mounted on the lower deck 9, I provide the motors 11 and 12 respectively, which are preferably adapted to be fueled by benzine, gasoline, or the like. The drive shafts of the motors 11 and 12 are provided with suitable clutch mechanism 14 adapted to be engaged so that the respective motors may be run in tandem.

15 represents a toothed drive wheel supported in suitable bearings 16 and adapted to be driven by the motor 11. Intermediate the drive wheel 15 and the motor 11, I provide a gear-shift mechanism 17 by which the speed between the motor 11 and the drive wheel 15 may be regulated. I do not wish to be limited to the use of any particular type of gear-shift. Below the drive wheel 15 is a rotatable shaft 18 suitably mounted in bearings 19. Fixedly mounted on the shaft 18 and in mesh with the drive wheel 15, I provide a pinion 20. Fixedly mounted on the shaft 18 in spaced relationship with the pinion 20, I provide a pinion 21, preferably the same diameter as the pinion 20. 22 and 23 designate gears of approximately four times the diameter of the pinion 21 which is in mesh therewith. 24 and 25 are rotatable shafts supported in bearings adjacent the gear wheels 22 and 23 respectively and upon which the pinions 26 and 27 are mounted in mesh with the gear wheels 22 and 23 respectively. 28, 29 and 30 designate propeller shafts connected by universal joints to the shafts 24, 18 and 25 respectively, which shafts are provided at their outer ends with water propellers 31, 32 and 33 respectively. The hull of the boat is troughed as at 7a, 7b, and 7c to provide inclined housing for the propeller shafts 28, 29 and 30 respectively, so that the water propellers will be exposed to a maximum area of water beneath the boat. From the foregoing description, it will be readily understood that a high degree of R. P. M. of the water propellers will be provided.

34 represents a horizontally mounted toothed drive wheel which has fixedly connected thereto the bevel gear 35. 36 represents a drive shaft which has a bevel gear 37 fixedly connected at one end thereof and which bevel gear is in mesh with the bevel gear 35. Intermediate the shaft 36 and the motor 12, I provide a gear reduction mechanism 38 by which the speed ratio between the motor 12 and the drive shaft 36 may be regulated. I do not wish to be limited to any particular design of speed reduction mechanism. 39 is a vertical shaft fixedly connected to the bevel gear 35, which shaft has fixedly mounted in the upper end thereof the bevel gear 40. 41 represents a horizontal shaft mounted in suitable bearings 42 below the deck 8 and which shaft has the bevel gear 43 fixedly connected thereto and in mesh with the bevel gear 40.

44 represents a vertical shaft which extends up through the vertical housing 45 which is supported on the deck 8. The vertical shaft 44 has fixedly connected thereto the bevel gear 46 which is in mesh with the bevel gear 42. 47 is a streamlined housing in which the propeller 48 is mounted and which propeller shaft and vertical shaft 44 are provided with intermeshing bevel gears mounted in the housing 47. Supported on the forward end of the propeller shaft 48, I provide the air propeller 49. 50 and 51 are pinions supported on the vertical shafts 52 and 53 respectively and in mesh with the drive wheel 34. 54 and 55 are vertical rotatable shafts universally connected at the lower ends to the shafts 52 and 53 respectively. The shafts 54 and 55 extend through the casing 56 and 57 respectively and are connected at their upper ends through suitable bevel gear transmission in the housings 58 and 59 respectively to the shafts of the propellers 60 and 61 respectively. From the foregoing, it will be readily appreciated that the ratio of R. P. M. between the air propellers and the drive wheel 34 will be such that the propeller will attain a high number of R. P. M.

The bearings for the water propellers and air propeller shafts are preferably constructed as disclosed in Fig. 6 in which the journal 62 is enclosed in a housing 63 to which the water supply pipe 64 and water discharge pipe 65 are connected. In the hull of the boat, I provide a water reservoir 66 into which water is pumped by the pump 67 from the body of water in which the boat is floating. Leading from the reservoir 66, I provide the water conduction pipe 68 which is branched as at 64' to convey cold water to the various bearings on the water propeller and air propeller shafts. The continuous flow of cold water to the bearings as just described will prevent such bearings from becoming overheated due to the high velocity of the propeller shafts rotating therein.

The fuel reservoir 69 is preferably located below the deck 9 in the hold 10 and has a fuel conduction pipe 70 which is provided with a pump 71, supported beneath the upper deck 8, which draws the fuel from the reservoir 69 into the fuel tank 72 supported above the motors 11 and 12. The fuel is conducted from the tank 72 through the pipe 73 to the motors as desired. 74 is a pilot's cabin in which the steering mechanism is located and in which suitable mechanism would be provided to control the speed of the boat. The pilot's cabin is preferably streamlined to provide the least resistance possible to the air.

The foregoing specification and annexed drawings disclose the preferred embodiment of my invention, but it is to be understood that minor changes may be resorted to in the commercial adaptation of my invention without departing from the scope of the invention as hereinafter claimed.

What I claim as new is:

A boat embodying propulsion means comprising a power plant; two toothed drive wheels adapted to be driven by said power plant; a plurality of water propellers; intermeshing gears between one of said drive wheels and the shafts of said water propellers; a plurality of air propellers supported on said boat and geared transmission mechanism between the other of said drive wheels and said air propellers.

In testimony whereof, I affix my signature.

BÉLA DOMBRÁDY.